Aug. 6, 1968 P. D. FRENCH 3,395,754

HEAT TRANSFER DEVICES AND METHOD OF MANUFACTURE

Filed Aug. 22, 1966

INVENTOR
PHILIP D. FRENCH
BY Fiebmar + Van Kirk
ATTORNEYS

United States Patent Office 3,395,754

Patented Aug. 6, 1968

3,395,754

HEAT TRANSFER DEVICES AND METHOD OF MANUFACTURE

Philip D. French, 77 Melody Lane, East Granby, Conn. 06026

Filed Aug. 22, 1966, Ser. No. 574,004
17 Claims. (Cl. 165—185)

ABSTRACT OF THE DISCLOSURE

Heat transfer devices and methods of fabricating such devices from honeycomb stock material. The devices are flexible and have an apertured core region, the formed honeycomb material exerting a spring force toward the core region. The shape of the core aperture may be altered to enable installation of the devices on various sized and shaped objects.

This invention relates to a heat transfer device and the method of manufacture of the heat transfer device. More particularly, this invention relates to a versatile fin type heat transfer device and method of manufacture therefor, the device being capable of application to a wide range of uses.

A constantly present problem in a wide variety of fields involves the need to provide effective heat exchanging to either conduct heat away from or to an object. This problem is particularly acute in the electronics field where it is often desirable to provide a good heat sink for cooling electronic components. Indeed, with some electronic components, for example power transistors, it is often a critical requirement that a highly effective heat sink be provided to dissipate the heat generated in the operation of the device. In the past a standard approach to the problem of cooling such electronic components has been to provide a heat sink specifically designed and sized for the particular electronic component. This approach has lead to the development of a class of heat sinks having practically no versatility whatsoever.

In the present invention a highly versatile heat transfer device has a body of honeycomb material extending from a flexible core region. The heat transfer device is formed from honeycomb stock and is formed in such a manner as to have an inherent spring force directed toward the flexible core region. The shape of the flexible core region can be altered to adapt or accommodate the heat exchanger device to a body with which heat is to be exchanged. The spring force directed toward the flexible core region assures intimate contact between the heat exchanger device and the body on which the device has been placed both to enhance good heat transfer and to physically retain the heat transfer device on the body. The flexibility of the core region allows the heat transfer device to be adapted to fit a substantial range of different sized bodies with which heat is to be exchanged. The honeycomb body of the heat transfer device provides a large number of fins and surface area for conduction, convection and radiation heat transfer. The general versatility of the heat transfer device of the present invention is further enhanced by the fact that the size, shape and number of fins and honeycomb cells can be varied as any particular design may require while retaining the overall concept of a heat transfer device with a flexible core region and a honeycomb body.

Accordingly, one object of the present invention is to provide a novel heat transfer device and method of manufacture thereof.

Another object of the present invention is to provide a novel heat transfer device, and method of manufacture thereof, suitable for general heat transfer use and particularly suitable for use as a heat sink.

Still another object of the present invention is to provide a novel heat transfer device, and method of manufacture thereof, particularly suitable for use as a heat sink for electronic components.

Still another object of the present invention is to provide a novel heat transfer device, and method of manufacture thereof, having the versatility of being adaptable for use with a wide range of components of different size and shape.

Still another object of the present invention is to provide a novel heat transfer device, and method of manufacture thereof, having a honeycomb body and a flexible core region.

Still another object of the present invention is to provide a novel heat transfer device, and method of manufacture thereof, wherein the device is inherently spring loaded to provide good heat transfer contact and good physical contact with a body to which heat is to be exchanged.

Other objects and advantages will be apparent from the following detailed description and drawings.

In the drawings, wherein like elements are numbered alike in the several figures.

Figures 1, 2, 3, 4, 5, 6, 7, 8, 10, 11, 12, 13, 14, 15:
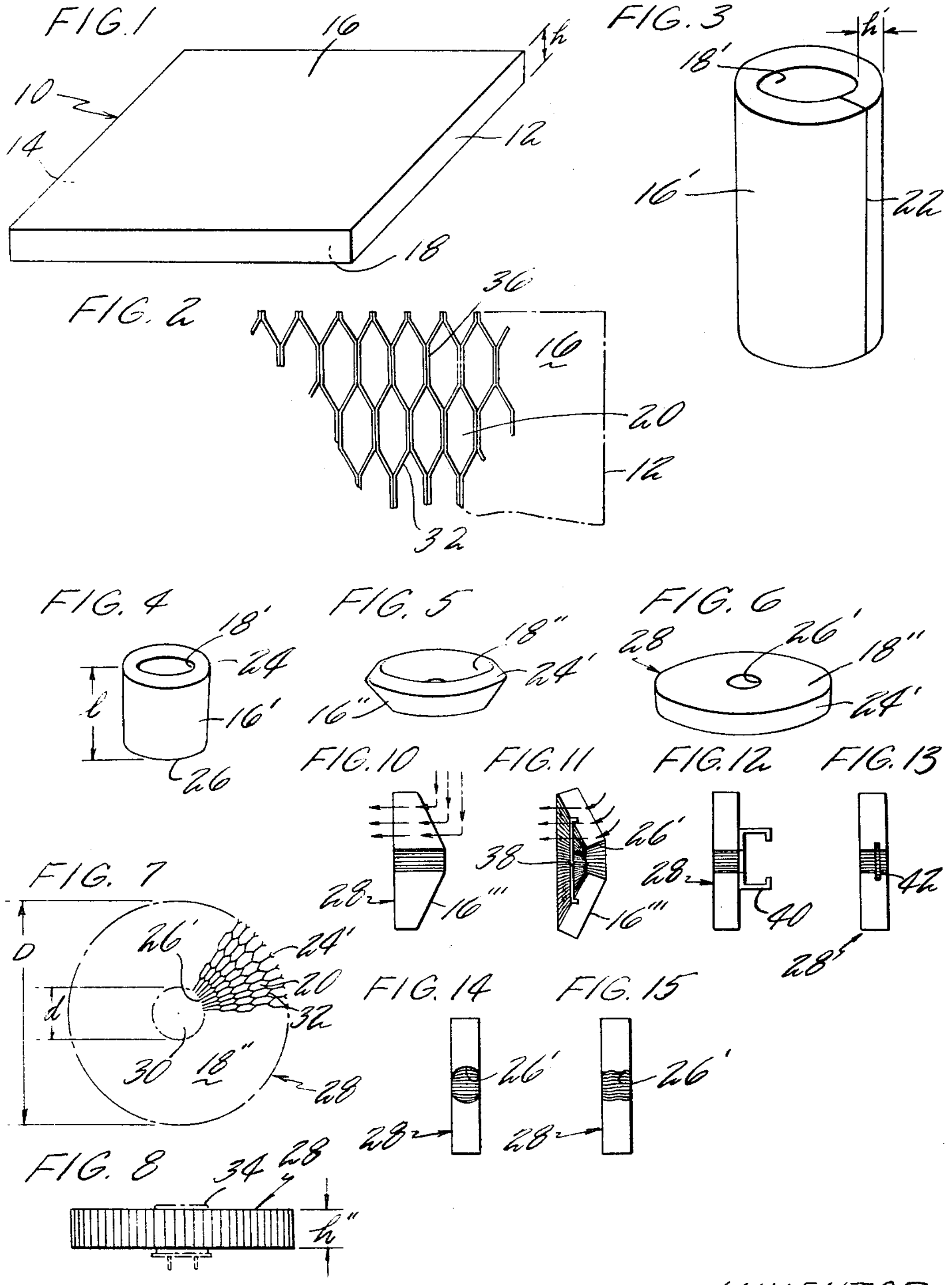
FIGURE 1 is a perspective view of a body of unexpanded honeycomb stock.
FIGURE 2 is a plan view of the body of FIGURE 1 showing a piece of the body partly expanded.
FIGURE 3 is a perspective view of the body of FIGURE 1 rolled into a tube form.
FIGURE 4 is a perspective view of a length of tubing cut from the tube of FIGURE 3.
FIGURE 5 is a perspective view of the tube of FIGURE 4 in a partly expanded state.
FIGURE 6 is a perspective view of a heat exchanger device of the present invention formed by further expansion of the FIGURE 5 configuration.
FIGURE 7 is a plan view of the heat transfer device of the present invention.
FIGURE 8 is an elevation view of the device of FIGURE 7.
FIGURE 10 is a sectional view showing a heat exchanger device of the present invention modified to include a tapered surface.
FIGURE 11 is a sectional view showing another tapered modification.
FIGURE 12 is a sectional view showing a heat transfer device permanently attached to a mounting.
FIGURE 13 is a sectional view showing a heat transfer device notched to receive an electronic component.
FIGURE 14 is a sectional view of a heat transfer device showing a regular contour for the core region.
FIGURE 15 is a sectional view showing a heat transfer device of the present invention with an irregular contour in the core region.

Referring now to FIGURE 1, a piece of unexpanded honeycomb stock 10 is shown, the unexpanded stock having been cut to proper dimensions for use in the present invention. When supported on an essentially flat surface in the unexpanded state, the honeycomb stock superficially appears to be a solid object, and thus the piece of stock 10 in FIGURE 1 appears merely as a block of material. A suitable unexpanded honeycomb stock for use in the present invention may be obtained from Hexcel Products, Inc. of Berkeley, Calif., the Hexcel product being known as Hobe. Alternatively, the unexpanded honeycomb core can be fabricated by laying thin sheets of material on top of each other and striping the length of each sheet with an adhesive at equally spaced apart places on each sheet before the next sheet is stacked, the striping in each sheet being mid-way between striping in each preceding sheet to provide two sets of offset joint lines. The adhesive bonds the sheets to each other at spaced apart lines so that when a bundle of sheets is urged apart the bundle expands to form honeycomb cells. As seen in FIGURE 1, the sheets from which unexpanded stock 10 is formed would be stacked in a layer parallel to edges 12 and 14, and the adhesive would be applied to each sheet in spaced apart rows perpendicular to upper surface 16 and lower surface 18 of stock 10. Since the height $h$ of stock 10 is relatively small, it may be desirable to cut the piece of stock 10 from a stack of larger sheets rather than forming the stock directly from sheets having a width $h$.

For the heat transfer device of the present invention the unexpanded honeycomb stock 10 would preferably be aluminum alloys or copper. However, a wide range of materials may be used depending on the particular heat transfer requirements and the joints between sheets may be cemented, soldered, welded, brazed or formed by any other suitable means. The individual sheets from which unexpanded stock 10 is formed are of relatively thin gauge, preferably in the range from .0007 inch to .005 inch, but it is to be expressly understood that a wide range of materials, sizes and honeycomb cell size and configuration may be used in the present invention.

Referring now to FIGURE 2, an enlarged detail is shown with a part of the stock 10 of FIGURE 1 in a partially expanded state. As described above, honeycomb cells 20 are formed by joining together a nested stack of sheets, the line of junction in each sheet being mid-way between the line of junctions in the preceding sheet. FIGURE 2 depicts a situation where edges 12 and 14 have been moved away from each other to partly expand stock 10.

Referring now to FIGURE 3, stock 10 is rolled into a tube by joining together edges 12 and 14 at a junction 22. Edges 12 and 14 are joined together along their entire length by any suitable adhesive such as high temperature epoxy cement, solder, braze, or weld material. The direction of rolling of stock 10 into the tube of FIGURE 3 is in the direction of the natural bending mode of stock 10 which is manifested by substantial curvature when the stock is supported as a cantilever beam at either edge 12 or edge 14. Thus, stock 10 is formed into a tube having stock upper surface 16 as the outer surface 16' of the tube, stock lower surface 18 as the inner surface 18' of the tube, and having a thickness $h'$ equal to the width $h$ of stock 10. As stock 10 is rolled into the tube form of FIGURE 3, the stock is partially expanded so that the outer surface 16' reveals the honeycomb cells 20 depicted in FIGURE 2; however, for simplicity of illustration the honeycomb nature of surface 16 in a tube form is not shown in the perspective of FIGURE 3.

The next step in the forming of the heat transfer device of the present invention is the cutting of a length $l$ from the tube of FIGURE 3, the length $l$ being shown in perspective in FIGURE 4. Of course, it will be obvious that the shorter tube of length $l$ could have been formed originally by proper sizing of stock 10; however, the initial fabrication of a longer tube allows the convenience of simultaneously performing the initial steps on a large body and then cutting the tube of FIGURE 3 into desired lengths.

Referring now to FIGURES 5 and 6, the next step in the formation of the heat transfer device is shown. One end of the tube, for example upper end 24 is expanded radially outwardly so that the inner surface 18' of the tube is transformed, as shown in FIGURES 5 and 6, into the upper surface 18'' of a disc-like cylinder 28, outer surface 16' becomes the lower surface 16'', upper end 24 becomes the outer edge 24', and lower end 26 becomes the inner edge 26'. FIGURE 6 shows the tube of FIGURE 4 fully expanded to the disc form 28, and this disc form 28 constitutes the essential structure of the heat transfer device.

Referring now to FIGURES 7 and 8, the details of disc 28 are shown. The disc has an outer diameter D, an inner diameter $d$, and has a height $h''$. The distance from inner edge 26' to outer edge 24', $$\frac{(D-d)}{2}$$

is equal to the length $l$ in the tube of FIGURE 4, and the height $h''$ is equal to the height $h$ of the stock of FIGURE 1. As can be seen in FIGURE 7, a plan view of disc 28, i.e. a view perpendicular to top surface 18'', shows that the disc is composed of connected coaxial rings of honeycomb cells 20 radiating outwardly from a center or core region 30 defined by inner edge 26'. The cells 20 in each ring increase in size with increasing distance from the center. Only a part of the disc of FIGURE 7 is shown with the detail of the honeycomb cells, but it will be understood that the rings of cells extend entirely around the disc so that the entire disc is composed of the cells.

The individual strips or sheets of material of which the honeycomb cells 20 are composed constitute fins 32 (also see FIGURE 2) which radiate outwardly from core region 30 from edge 26' to edge 24'. Each fin 32 is joined to its two adjacent fins at alternate radial intervals to form the honeycomb structure as shown in FIGURE 7. The core region 30 is flexible in the sense that diameter $d$ can be enlarged by exerting a radially outward force on the honeycomb structure. Furthermore, the flexibility of core 30 is such that the dimension $d$ can be uniformly changed by applying a uniform radially outward force on the entire honeycomb structure, or the core region can be varied irregularly by the application of radially outward forces which are not uniform around the entire disc.

As shown in FIGURE 8, a device with which it is desired to establish a heat transfer relationship, such as a transistor 34, is held within the flexible core region 30. The diameter of transistor 34 is greater than the unflexed diameter $d$ of core region 30, and disc 28 is attached to transistor 34 by exerting a radial force on the honeycomb structure of the disc to enlarge core region 30. Transistor 34 is then inserted into the enlarged core region, and the radial forces are removed to allow the inwardly directed radial spring force of the disc to contract the core region to bring inner edge 26' into intimate contact with the transistor. In the simplest mode of operation, disc 28 would be manually stretched to enlarge core region 30 for receipt of the body with which heat is to be exchanged, and then the manual pulling or stretching force would be released to allow the opposing spring force to bring inner edge 26' into contact with the device.

As depicted in FIGURE 8, disc 28 serves as a heat sink to remove heat from transistor 34. Since, as described above, disc 28 can be viewed as an array of a large number of radially extending fins joined together at radial intervals, a particularly effective heat transfer device is realized in that the large number of fins contributes to high conduction heat transfer while the extensive surface area of the fins in the honeycomb array contributes to effective convection and radiation heat transfer. For example, with an array of 240 fins of a thickness of 0.0025 inch, and with an unflexed diameter $d$ of approximately 0.2 inch, an outer diameter D of approximately 1.4 inches, and a height $h''$ of approximately 0.25 inch, and honeycomb cell size of approximately 0.2 inch peak to peak in a radial direction, the surface area of the entire disc is approximately 53 square inches. This surface area dimension is approximately 360 times the conduction area, thus resulting in a device having an extremely high surface area to conduction area ratio, especially considering the small occupied volume.

The inherent radially inwardly directed spring force of the entire disc 28 assists in attaining and maintaining intimate contact at the contact surface between inner edge 26' and the surface of the device with which heat is to be transferred. This spring loading and resultant intimate contact enhances good conductive heat transfer between the body with which heat is to be transferred and the fins which contact the body. The spring force also acts to physically retain the disc on the body. The flexibility of core 30 and the spring characteristic of disc 28 result in a device that can fit a substantial range of sizes and shapes and can also automatically compensate for departures from design tolerances in characteristics such as diameter, ovality and taper.

With regard to the contact between inner edge 26' and the device with which heat is to be exchanged, it should be observed that disc 28 can be provided with either of two different types of contact between fins and body. If the lentgh of tube cut from the original tube of FIGURE 3 is cut through the joined surfaces of the honeycomb (see the joined surfaces 36 indicated by way of example in FIGURE 2) then the fins will contact the body as bonded pairs of fins as shown in the FIGURE 7 embodiment. However, if the cut is through the cells themselves and between the joined surfaces, the fins then contact the body as separate fins with the result that there is an increase in fin surface area in immediate contact with the body.

Figure 9:
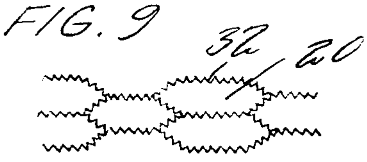
FIGURE 9 is a view showing corrugated honeycomb stock for use in a modified form of the present invention.

Referring now to FIGURE 9, a modification is shown in the material of which disc 28 is composed. In the modification of FIGURE 9, the material defining the honeycomb cells 20, i.e. the radially extending fins 32, is itself corrugated to provide a substantial increase in heat transfer surface area. As previously described with respect to the noncorrugated structure, the corrugated honeycomb stock can be formed by joining corrugated sheets in a nested stack with equally spaced line joints in each succeeding sheet being offset midway between joints in the preceding sheet.

Referring now to FIGURES 10 and 11, modifications are shown in which one surface of disc 28 is tapered for the purpose of insuring that transverse fluid flow in the direction shown by the arrows will impinge on the taper and then be deflected through disc 28, as shown, through the honeycomb cells. The taper enhances flow of heat exchange fluid through the open honeycomb cells of disc 28 regardless of the initial direction of fluid flow.

In the FIGURE 10 embodiment the taper is accomplished by removing a part of one of the surfaces of disc 28, for example by cutting bottom surface 16'' to the taper 16''' either after formation of the disc or by cutting a corresponding surface at another stage of manufacture.

In the modification shown in FIGURE 11, the taper 16'' is accomplished by installing disc 28 at a sloping angle, i.e. in a state in which disc 28 is only partly expanded between the tube form of FIGURE 4 and the disc form of FIGURE 6. The FIGURE 11 structure results in a taper in inner contact surface 26', and a spanning clip 38 may be required to prevent disc 28 from snapping off from any device on which it may be mounted. This taper of surface 26' may, of course, be eliminated by cutting the corresponding surface of the stock of FIGURE 1 or the tube of FIGURE 4.

Referring now to FIGURE 12, another modification is shown in which the disc 28 is permanently mounted on a support 40. The support 40 can be provided with a central opening if it is desired to insert the device with which heat is to be transferred into disc 28 beyond the contact between disc 28 and support 40. Of course, it will be observed that flexibility of the device is greatly reduced by mounting the device on a permanent support, but such permanent mounting might be required for particular applications.

Referring now to FIGURE 13, the bottom surface 16'' is provided with a notch 42, the purpose of the notch being to allow room to clear a flange on a semiconductor case or other device.

Referring to FIGURES 14 and 15, inner contact surface 26' can be molded or shaped to fit either regularly shaped volumes or irregularly shaped volumes. As shown by way of example in FIGURE 14, inner edge 26' can be regularly shaped to fit a volume having a smooth curved contour such as an oval or an ellipsoid or a straight regular surface such as a square or hexagon. As shown in FIGURE 15, inner edge 26' can be worked to provide an irregular surface for contact with an irregularly shaped object. The working of edge 26' to fit an irregular contour could be accomplished, if desired, while the honeycomb stock was still in an unexpanded state.

It should be observed that the heat transfer device disclosed herein is capable of the use for either heating or cooling. For example, it can be used as a heat sink for any heat sink applications such as, for example but not by way of limitation, semi-conductor devices or vacuum tubes; it also can be used as a fin type heater to supply heat from a heat source or to a heat receptical mounted within core 30.

It should also be noted that a disc 28 can be formed directly from a suitably seized piece of stock like that of FIGURE 1 by directly expanding the stock in a rotational manner in a plane parallel to surfaces 16 and 18 to join ends 12 and 14. However, care must be taken to avoid permanent setting of honeycomb core shape by overexpanding part of the material during the rotation.

While preferred embodiments have been shown and described, various modifications and substitutions may be made without departing from the spirit and scope of this invention. Accordingly, it is to be understood that this invention has been described by way of illustration rather than limitation.

I claim:

1. A heat transfer device including:
a flexible core region; and
a plurality of fins extending radially from said flexible core region, the edges of said fins defining top and bottom surfaces for said heat transfer device;
each of said fins being attached to adjacent fins at at least two radial intervals to form an array of fins, and
said array having a spring force with at least a component of said spring force being directed toward said core region.

2. A heat transfer device as in claim 1 wherein said array of fins is a closed array defining said core region, at least two of said fins forming a closure section for said array, each of said fins in said array other than in said closure section being attached to adjacent fins at uniform radial intervals in the unflexed state of said core region.

3. A heat transfer device as in claim 2 wherein said fins cooperate to form a cellular structure.

4. A heat transfer device as in claim 1 wherein at least some of said fins are corrugated.

5. A heat transfer device as in claim 1 wherein at least one of said top and bottom surfaces is tapered.

6. A heat transfer as in claim 1 wherein said spring force is substantially radially inward toward said core region.

7. A heat transfer device including:
a cellular array having a flexible core section and a plurality of fins extending radially from said core section and joined together at radial intervals to form said cellular array;
said cellular array being formed by bringing together the end sections of a length of unexpanded cellular stock to a tubular form having first and second end surfaces and inner and outer surfaces, joining the end sections of said stock, and expanding one of said surfaces outwardly to form said cellular array.
said end surfaces of said tubular form becoming inner and outer surfaces in said cellular array and said inner and outer surfaces of said tubular form becoming end surfaces in said cellular array.

8. A heat transfer device as in claim 7 wherein said tubular form is a cylindrical form having parallel first and second end surfaces and cylindrical inner and outer surfaces and wherein said first and second parallel surfaces in said tubular form become cylindrical inner and outer surfaces in said cellular array and said cylindrical inner and outer surfaces in said tubular form become parallel end surfaces in said cellular array.

9. A heat transfer device as in claim 7 wherein said cellular array has a spring force, at least a component of said spring force being directed toward said core section.

10. A heat transfer device as in claim 9 wherein said spring force is substantially radially inward toward said core section.

11. A heat transfer device as in claim 7 wherein said fins at other than the junction of said end sections are attached to adjacent fins in said array at uniform radial intervals in the unflexed state of said core section.

12. A heat transfer device as in claim 7 wherein at least some of said fins are corrugated.

13. A heat transfer device as in claim 7 wherein at least one of said end surfaces of said cellular array is tapered.

14. A heat transfer device as in claim 7 wherein said tubular form is a section cut from a first formed larger tubular form.

15. In the method of forming a heat transfer device from a section of unexpanded cellular stock, having first and second end sections, the steps of:

bringing together said first and second end sections to a tubular form having first and second end surfaces and inner and outer surfaces;

joining together said first and second end sections; and expanding one of said first and second end surfaces outwardly to form a cellular array, said first and second end surfaces of said tubular form becoming inner and outer surfaces in said cellular array and said inner and outer surfaces of said tubular form becoming end surfaces in said cellular array, the inner surfaces of said cellular array defining a flexible core in said cellular array.

16. The method of forming a heat transfer device as in claim 15 wherein said tubular form is cylindrical in form having parallel first and second end surfaces and cylindrical inner and outer surfaces, and wherein said first and second parallel surfaces in said tubular form become cylindrical inner and outer surfaces in said cellular array and said cylindrical inner and outer surfaces in said tubular form become parallel end surfaces in said cellular array.

17. The method of forming a heat transfer device as in claim 15 including the step of cutting said tubular form from a longer length of tubular form.

References Cited

UNITED STATES PATENTS 3,198,990 8/1965 Katzin -------------- 165—185

ROBERT A. O'LEARY, *Primary Examiner.*

CHARLES SUKALO, *Assistant Examiner.*